(12) United States Patent
Liu (10) Patent No.: US 8,411,656 B2
(45) Date of Patent: Apr. 2, 2013

(54) MULTI-USER, MULTI-MODE BASEBAND SIGNALING METHODS, TIMING/FREQUENCY SYNCHRONIZATION, AND RECEIVER ARCHITECTURES

(75) Inventor: Jung-Tao Liu, Saratoga, CA (US)

(73) Assignee: Ablaze Wireless, Inc., San Jose, CA (US)

( * ) Notice: Subject to any disclaimer, the term of this patent is extended or adjusted under 35 U.S.C. 154(b) by 280 days.

(21) Appl. No.: 12/819,726

(22) Filed: Jun. 21, 2010

(65) Prior Publication Data
US 2010/0322218 A1 Dec. 23, 2010

Related U.S. Application Data

(60) Provisional application No. 61/218,954, filed on Jun. 21, 2009.

(51) Int. Cl.
*H04W 4/00* (2009.01)
(52) U.S. Cl. ...................................... 370/338
(58) Field of Classification Search ........................ None
See application file for complete search history.

(56) References Cited

U.S. PATENT DOCUMENTS

| | | | |
|---|---|---|---|
| 2007/0254620 A1* | 11/2007 | Lindqvist et al. | 455/403 |
| 2008/0261602 A1 | 10/2008 | Livneh | |
| 2009/0061873 A1* | 3/2009 | Bao et al. | 455/436 |
| 2009/0270096 A1* | 10/2009 | Somasundaram et al. | 455/434 |
| 2010/0027694 A1* | 2/2010 | Touboul et al. | 375/260 |
| 2010/0246386 A1* | 9/2010 | Erceg et al. | 370/225 |

FOREIGN PATENT DOCUMENTS

WO 2009/029409 A1 3/2009

* cited by examiner

*Primary Examiner* — Gregory Sefcheck
*Assistant Examiner* — Minh-Trang Nguyen
(74) *Attorney, Agent, or Firm* — Birch, Stewart, Kolasch & Birch, LLP (57) ABSTRACT

A femtocell wireless signaling/data mesh network for multi-user, multi-mode baseband signaling methods, timing/frequency synchronization, and receiver architectures is disclosed. The femtocell wireless signaling/data mesh network includes a plurality of femtocells connected by a plurality of wireless links. A first femtocell of the plurality of femtocells directly communicates with a second femtocell of the plurality of femtocells via a wireless link between the first femtocell and the second femtocell.

8 Claims, 7 Drawing Sheets

MULTI-USER, MULTI-MODE BASEBAND SIGNALING METHODS, TIMING/FREQUENCY SYNCHRONIZATION, AND RECEIVER ARCHITECTURES

CROSS REFERENCE TO RELATED APPLICATIONS:

This nonprovisional application claims the benefit of U.S. Provisional Application No. 61/218,954 filed on Jun. 21, 2009. The entire contents of the above application is hereby incorporated by reference into the present application.

BACKGROUND OF THE INVENTION

1. Field of the Invention

The present invention relates to a telecommunication system, and more particularly, to a femtocell wireless signaling/data mesh network for multi-user, multi-mode baseband signaling methods, timing/frequency synchronization, and receiver architectures.

2. Description of the Prior Art

In general, conventional basestation transceivers are connected to the basestation controllers through dedicated communication links such as T1 or E1 lines. These basestation controllers are connected to each other and also connected to other network equipments such as Serving GPRS Support Node (SGSN) or Gateway GPRS Support Node (GGSN) in General Packet Radio Service (GPRS) network.

For example, in a 3G Universal Mobile Telecommunications System (UMTS) system, each of basestation controllers (RNC) is connected to a plurality of basestation transceiver (Node B) to form a communication network called UMTS Terrestrial Radio Access Network (UTRAN). The UTRAN is connected to the Core Network equipments such as SGSN, GGSN, MSC (Mobile Switching Center), CGF (Charging Gateway Function), HLR/VLR (Home Location Register/Visitor Location Register), and/or MGW (Media Gateway) using Asynchronous Transfer Mode (ATM) switches over either T1 or E1 lines.

Figure 1:
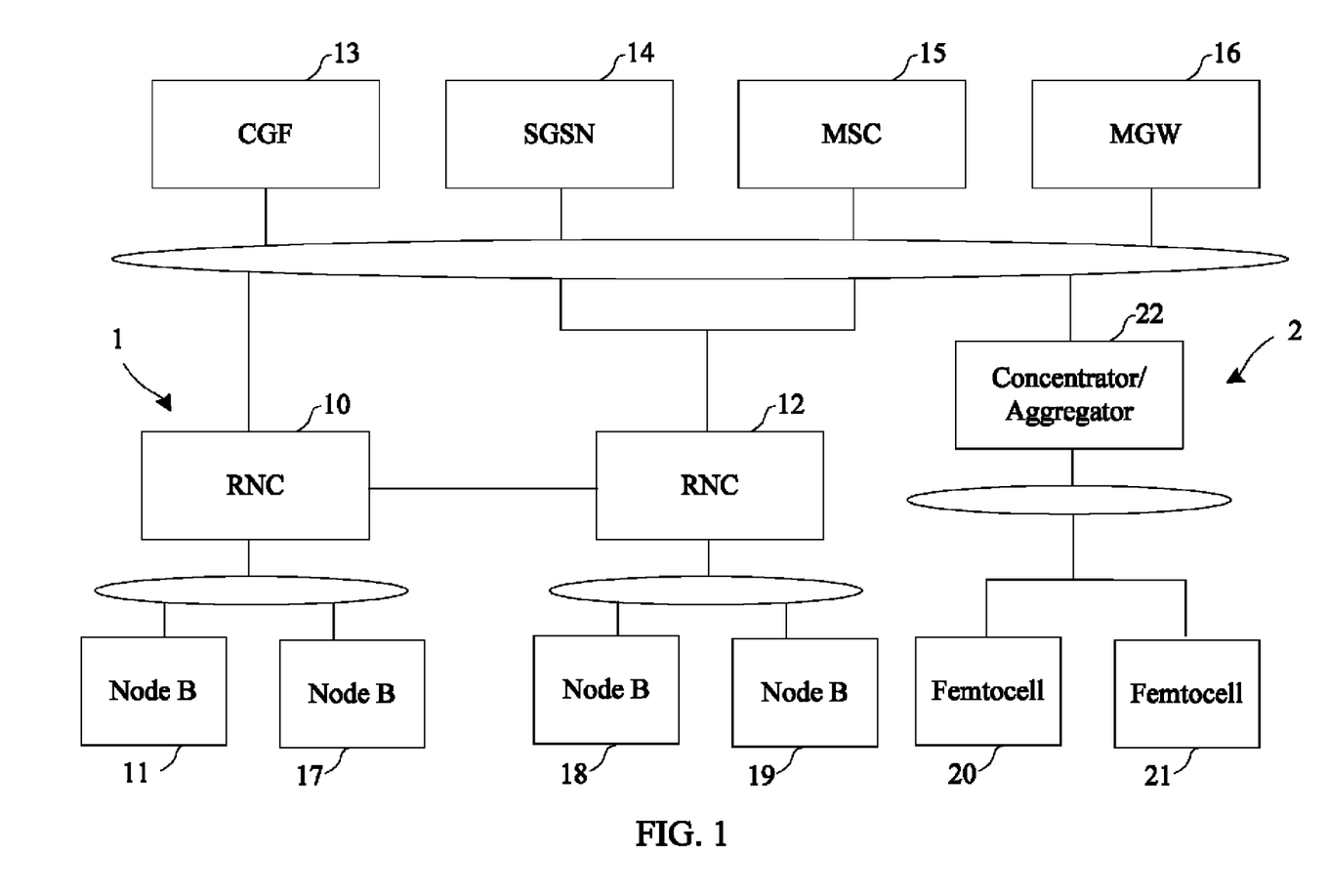
FIG. 1 illustrates comparisons between a conventional cellular network architecture and a femtocell network architecture.

Recently, a femtocell (Home Node B) is a miniature device in the size of a CPE which functions as a combination of RNC and Node B and is connected through internet to the Core Network. Please refer to FIG. 1. FIG. 1 illustrates comparisons between a conventional cellular network architecture and a femtocell network architecture. As shown in FIG. 1, the cellular network architecture 1 is shown on the left-hand side and the femtocell network architecture 2 is shown on the right-hand side. In the cellular network architecture 1, the communications between the RNCs 10 and 12 are possible; in the femtocell network architecture 2, the communications between femtocells 20 and 21 must router through a concentrator/aggregator 22. Therefore, the traffic loading between the concentrator/aggregator 22 and femtocells 20 and 21 will become very heavy.

Figure 2:
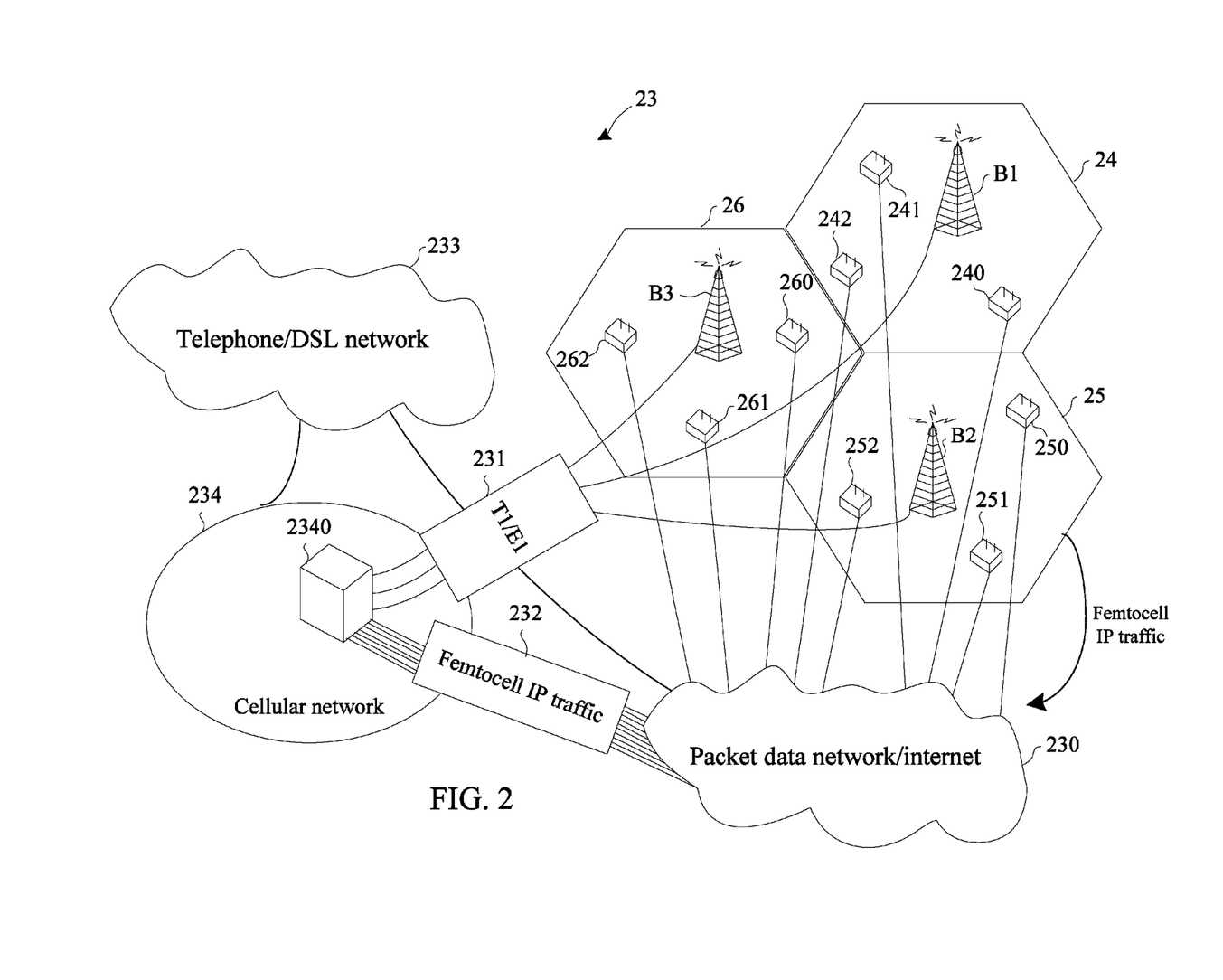
FIG. 2 illustrates an example of no communication/connections between femtocells available in the 3G UMTS system.

It should be noticed that since RNC and Home Node B are now combined into the femtocell while femtocells are connected to the Core Network through Internet using TCP/IP protocol, the femtocell network architecture 2 can eliminate the need for any dedicated connections between RNC and Home Node B. Please refer to FIG. 2. FIG. 2 illustrates an example of no communication/connections between femtocells available in the 3G UMTS system. Since there are no direct communication/connections between femtocells 240-242, 250-252, and 260-262 available in the 3G UMTS system 23 as shown in FIG. 2, all communications in the 3G UMTS system 23 must go through the packet data network/internet 230 or any intermediate devices such as a femtocell concentrator/aggregator 2340. That is to say, the femtocell concentrator/aggregator 2340 is used as a gateway for femtocells wanting to connect to the telephone/DSL network 233. In the conventional UTRAN, protocol interfaces are defined to facilitate the communications between Node B and RNC, RNC and RNC, RNC and Core Network components. There is no communication protocols defined between Node Bs. Therefore, the traffic loading between femtocells and concentrators (aggregator) will become heavier, the cost of the network equipment will become higher, and handovers among basestations will also become slower.

Moreover, when a wireless link is used for signaling and data transmissions between the femtocells, there are still many challenges needed to be overcome as follows. (1) Femtocell must be able to maintain a list of neighboring cells information; (2) Femtocells must be able to self-define the roles they play for a given link, such roles include SRNC, DRNC, and CRNC, but not limited to these cases; (3) Wireless link must be able to establish a reliable link to the neighboring femtocells; (4) Femtocells must be able to exchange physical layer information through the wireless link, such as primary scrambling code, RF capability (e.g., frequency channel supported, maximum/minimum power, average power), or current cell loading; (5) Femtocell must be able to route the information received through Wi-Fi links to its RRM entity for further processing; (6) Femtocell must be able to detect the RF interference level at each Wi-Fi frequencies and negotiate with the neighboring femtocells to switch to the best channel it perceives; (7) The Wi-Fi module inside the Femtocell must be able to perform in both the infrastructure mode and the ad hoc mode; (8) Femtocell must be able to share L1 measurement information between neighboring cells.

Therefore, the invention provides a femtocell wireless signaling/data mesh network to solve the aforementioned problems.

SUMMARY OF THE INVENTION

The invention provides a femtocell wireless signaling/data mesh network having wireless communication links established directly between the femtocells using widely available point-to-point/point-to-multi-point wireless communication system.

An embodiment of the invention is a femtocell wireless signaling/data mesh network. In this embodiment, the femtocell wireless signaling/data mesh network includes a plurality of femtocells connected by a plurality of wireless links. A first femtocell of the plurality of femtocells directly communicates with a second femtocell of the plurality of femtocells via a wireless link between the first femtocell and the second femtocell.

In practical applications, the plurality of wireless links is based on a point-to-point wireless communication system or a point-to-multi-point wireless communication system based on Wi-Fi technology, WiMAX technology, CDMA technology, GSM technology, GPRS technology, IS95 technology, or Bluetooth technology. It should be noticed that the plurality of femtocells is connected to a concentrator/aggregator of a cellular network, the communication between the first femtocell and the second femtocell offloads the traffic between the concentrator/aggregator and the first femtocell/the second femtocell.

Compared to prior arts, the invention provides a femtocell wireless signaling/data mesh network having wireless communication links established directly between the femtocells using widely available point-to-point/point-to-multi-point wireless communication system, such as Wi-Fi, WiMAX, or other wireless communication technologies. Since all challenges for establishing wireless links between the femtocells are overcome in the invention, therefore, the heavy traffic between femtocells and concentrators in prior arts can be effectively off-loaded, the handovers can become faster, and the cost of the entire network equipment can be also largely reduced.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

In this invention, a femtocell wireless signaling/data mesh network having wireless communication links directly established between the femtocells using widely available point-to-point/point-to-multi-point wireless communication system, such as Wi-Fi, WiMAX, or other wireless communication technologies is disclosed.

Figure 3:
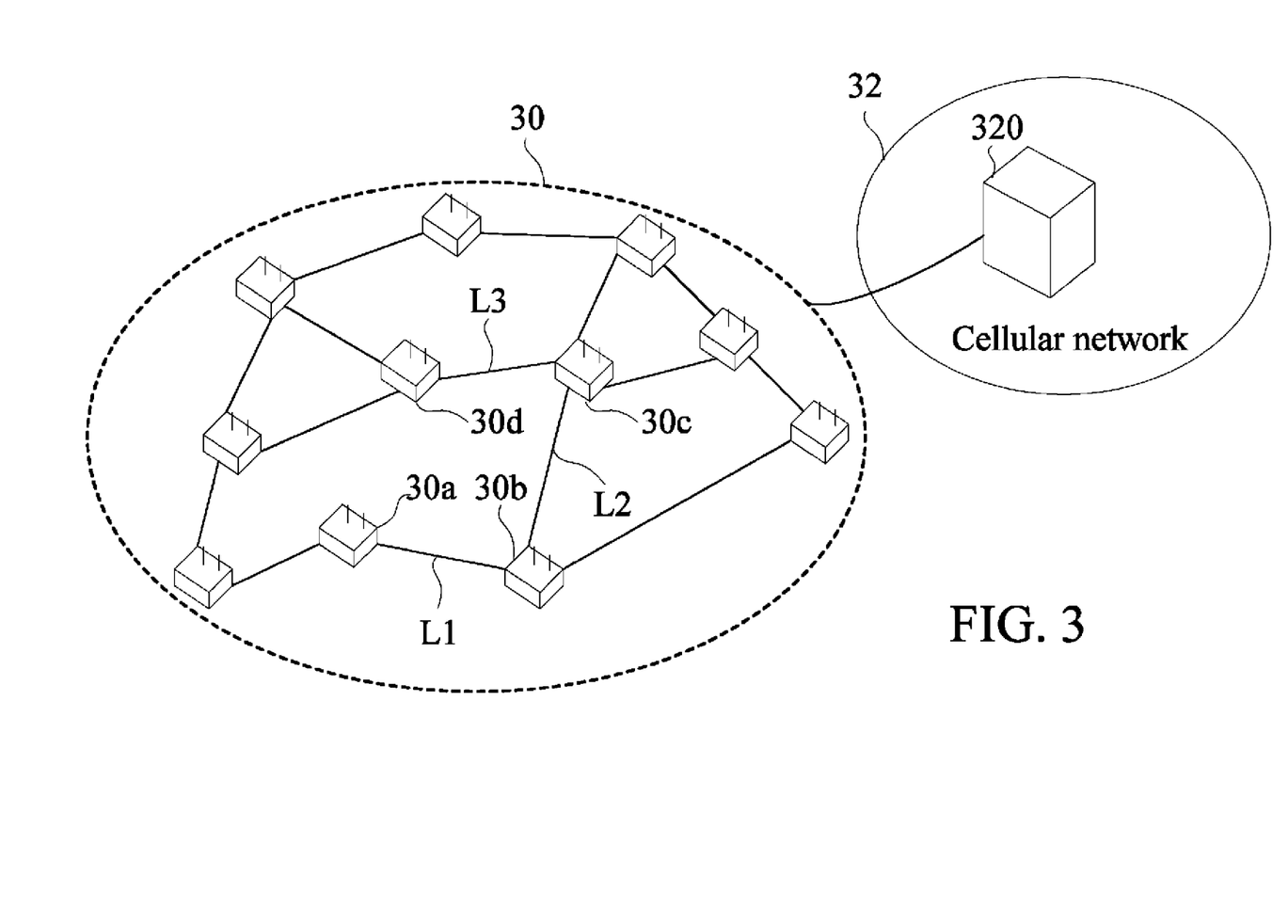
FIG. 3 illustrates the femtocell wireless signaling/data mesh network of the first embodiment of the invention.

A first embodiment of the invention is a femtocell wireless signaling/data mesh network. Please refer to FIG. 3. FIG. 3 illustrates the femtocell wireless signaling/data mesh network of the first embodiment of the invention. As shown in FIG. 3, there are wireless links existed between two adjacent femtocells in the femtocell wireless signaling/data mesh network 3. For example, a wireless link L1 is formed between a first femtocell 30a and a second femtocell 30b; a wireless link L2 is formed between the second femtocell 30b and a third femtocell 30c; a wireless link L3 is formed between the third femtocell 30c and a fourth femtocell 30d, and so on. Since wireless communication links L1-L3 between the femtocells 30a-30d are allowable, the traffic between femtocells 30a-30d and a concentrator/aggregator 320 in a cellular network can be effectively offloaded.

Figure 4:
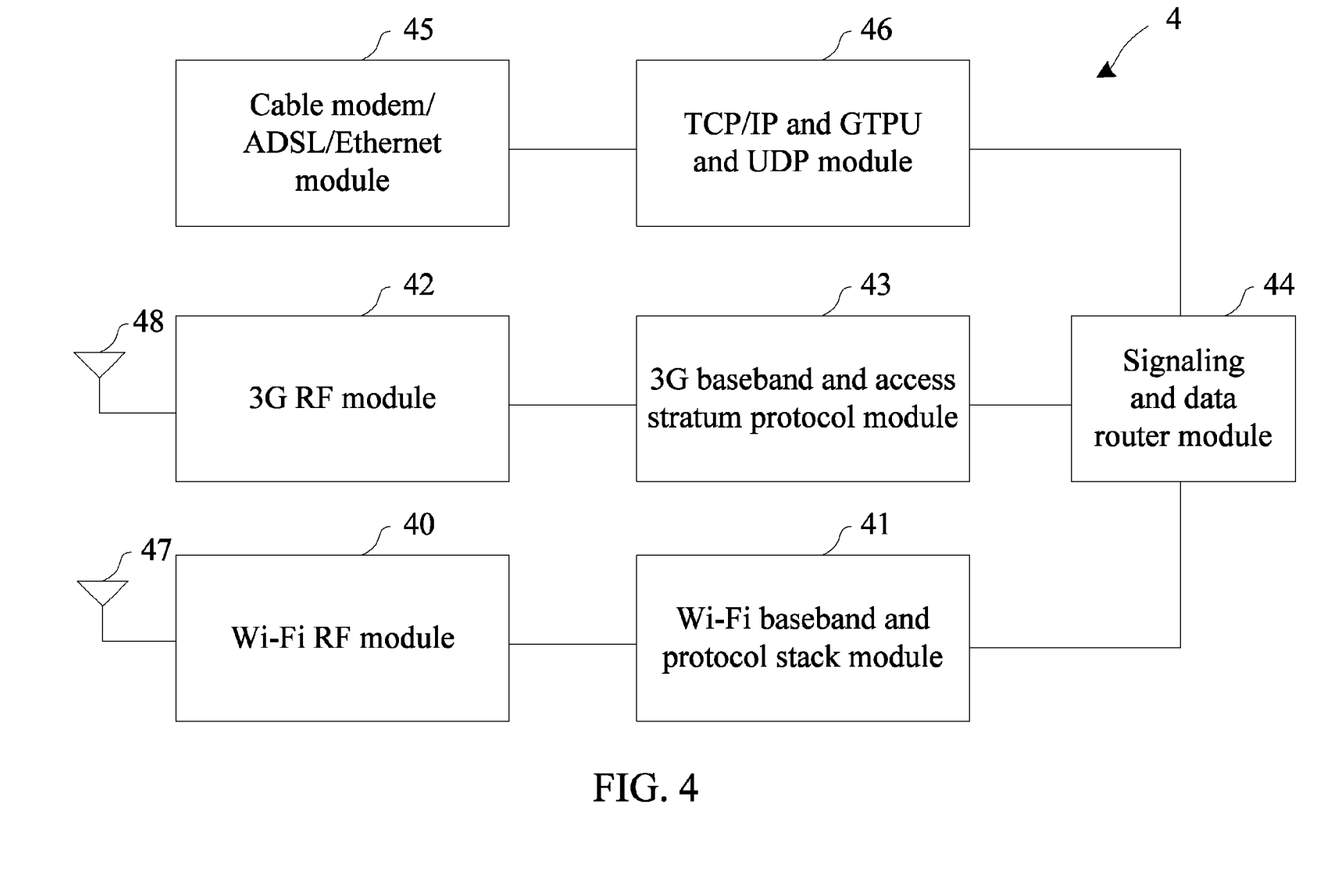
FIG. 4 illustrates an exemplary system block diagram indicating how to integrate the wireless function into the femtocell devices.

Please refer to FIG. 4. FIG. 4 illustrates an exemplary system block diagram indicating how to integrate the wireless function into the femtocell devices. It should be noticed that although Wi-Fi is used as the exemplary wireless link while other wireless technologies such as WiMAX can be also used as the wireless link.

As shown in FIG. 4, the femtocell system 4 includes a Wi-Fi RF module 40, a Wi-Fi baseband and a protocol stack module 41, a 3G RF module 42, a 3G baseband and access stratum protocol module 43, a signaling and data router module 44, a cable modem/ADSL/Ethernet module 45, a TCP/IP and GTPU and UDP module 46, a first antenna 47, and a second antenna 48. Wherein, the Wi-Fi RF module 40 is coupled to the Wi-Fi baseband and a protocol stack module 41 and the first antenna 47; the 3G RF module 42 is coupled to the 3G baseband and access stratum protocol module 43 and the second antenna 48; the cable modem/ADSL/Ethernet module 45 is coupled to the TCP/IP and GTPU and UDP module 46; the signaling and data router module 44 is coupled to the Wi-Fi baseband and a protocol stack module 41, the 3G baseband and access stratum protocol module 43, and the TCP/IP and GTPU and UDP module 46 respectively.

In the femtocell system 4, a neighboring cell list is acquired during the measurement initial setup and neighboring cells are listed on the neighboring cell list. And then, the Wi-Fi RF module 40 and the Wi-Fi baseband and a protocol stack module 41 will handle signaling and user data for the neighboring cells listed on the neighboring cell list. In addition, the signaling and data router module 44 is used for directing the user data and signaling protocol to either the Core Network through Cable Modem/ADSL/Ethernet, or the wireless link when the data and/or signaling are for other femtocells. In practical applications, the femtocell system 4 can have one or plural of antennas attached to the Wi-Fi RF module 40 or the 3G RF module 42.

Under the architecture of femtocell wireless signaling/data mesh network, the femtocells can perform the following functions over the wireless link. The femtocells can automatically measure and detect the neighboring cells and perform frequency and power scanning; the femtocells can also ramp up/ramp down power during the measurement phase according to a pre-defined power sequence and send soft-handover information to other femtocells; the femtocells can reroute HSPA data buffer contents to other femtocells, broadcast the list of connected and idle users, send measurement information and IP address information, initiate SSL tunnel or over secure tunneling protocol to other femtocell, estimate distances between self and other femtocell nearby and use that information to adjust and optimize femtocell transmit power, periodically update the neighboring cell information, and follow a set of predefined rules to self coordinates and decide the roles between SRNC, CRNC, and DRNC for UE involved.

In the above-mentioned embodiment, a family of femtocell devices capable of communicating with each other over a wireless link is proposed. This novel new femtocell CPE has the built-in intelligence to perform automatic neighboring cell update, soft handover, HSPA buffer re-route, self-coordinating, and many other network measurement and management tasks among themselves. The introduction of this "mesh capable" family of femtocells can greatly reduce the traffic between the femtocells and the concentrator/aggregator, the complexity of the femtocell concentrator/aggregator, and further reduce the cost of deploying the femtocell in existing cellular networks.

A second embodiment of the invention is a method of wirelessly connecting femtocells by using Wi-Fi. In this embodiment, Wi-Fi is used as an example and the femtocells can communicate with each other over a wireless link. In practical applications, not only Wi-Fi can be used as the wireless link, but also any other wireless communication system, such as WiMAX, UWB, 3G (CDMA2000), 2G (GSM, GPRS, IS95), or Bluetooth, can be also used.

The femtocell first tries to connect to as many Wi-Fi as possible for all frequency bands supported to acquire the neighboring cell list. Then, it maintains the connection with the femtocells nearby. With the communication channel established, the femtocells can talk to each other and transmit RNSAP signaling over the interface making soft handover possible. Other information such as L1 measurements, physical layer parameters, is sent over the link as well. Such information can be used to determine whether the Wi-Fi link is a femtocell or just a Wi-Fi access point. When the transmit power information (max, min, average) is combined with L1 measurement and the information on UE SNR, the transmit power information can be used for advanced interference coordination and optimization.

However, when the wireless link is used for signaling and data transmissions between the femtocells, many challenges mentioned in Description of the prior art are still needed to be overcome. In this embodiment, the method of wirelessly connecting femtocells can effectively overcome these challenges.

In the prior arts, it is almost impossible for the network to acquire the neighboring cell information without information of the exact location of the femtocells. Even with the neighboring cell information, there is no guarantee that a UE can see two nearby femtocells simply because they are physically near each other. Therefore, even a GPS which can identify the location of the femtocell still fails to provide a true picture of the RF environment surrounding itself and be used to create the neighboring cell information needed for software handover.

In this embodiment, a slow frequency hopping method is used to acquire neighboring cell signals. This is because an interference caused by the transmitting of other devices may be occurred when Wi-Fi is used to acquire the neighboring cell signals; therefore, the slow synchronous frequency hopping between carriers can avoid such interference to interfere with the acquisition of the neighboring cell signals.

Figure 5A:
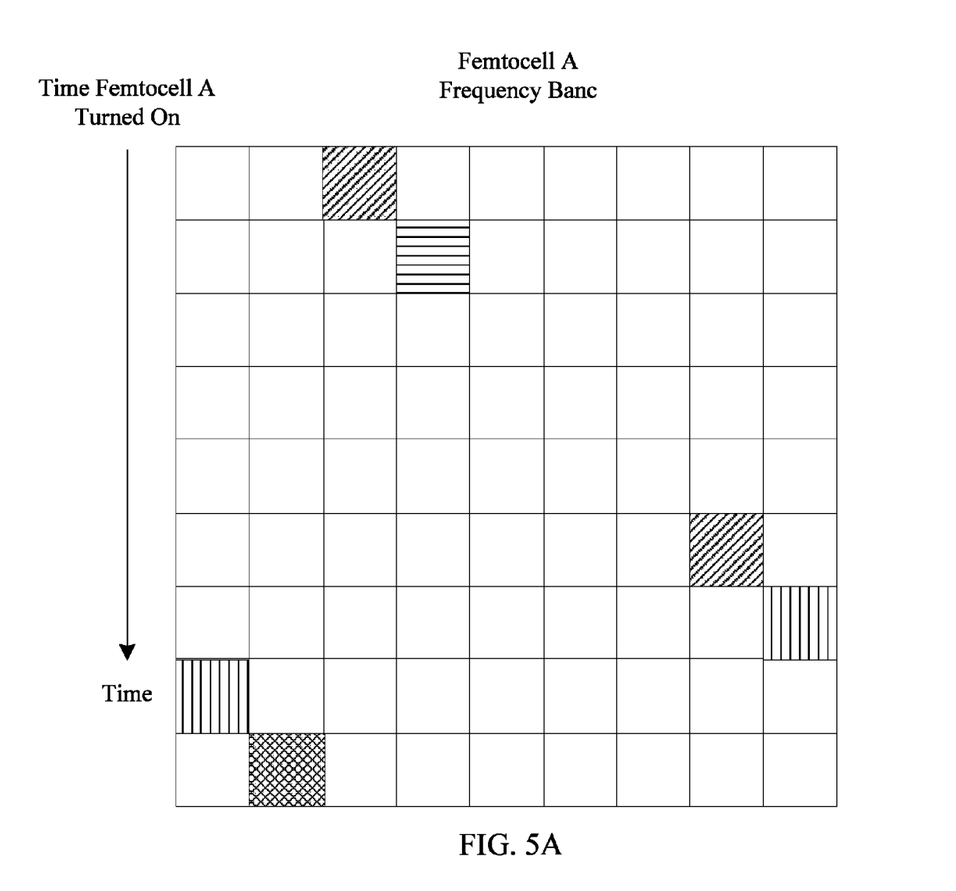
FIGS. 5A and 5B illustrate an example of slow frequency hopping for neighboring cell signal acquiring.
Figure 5B:
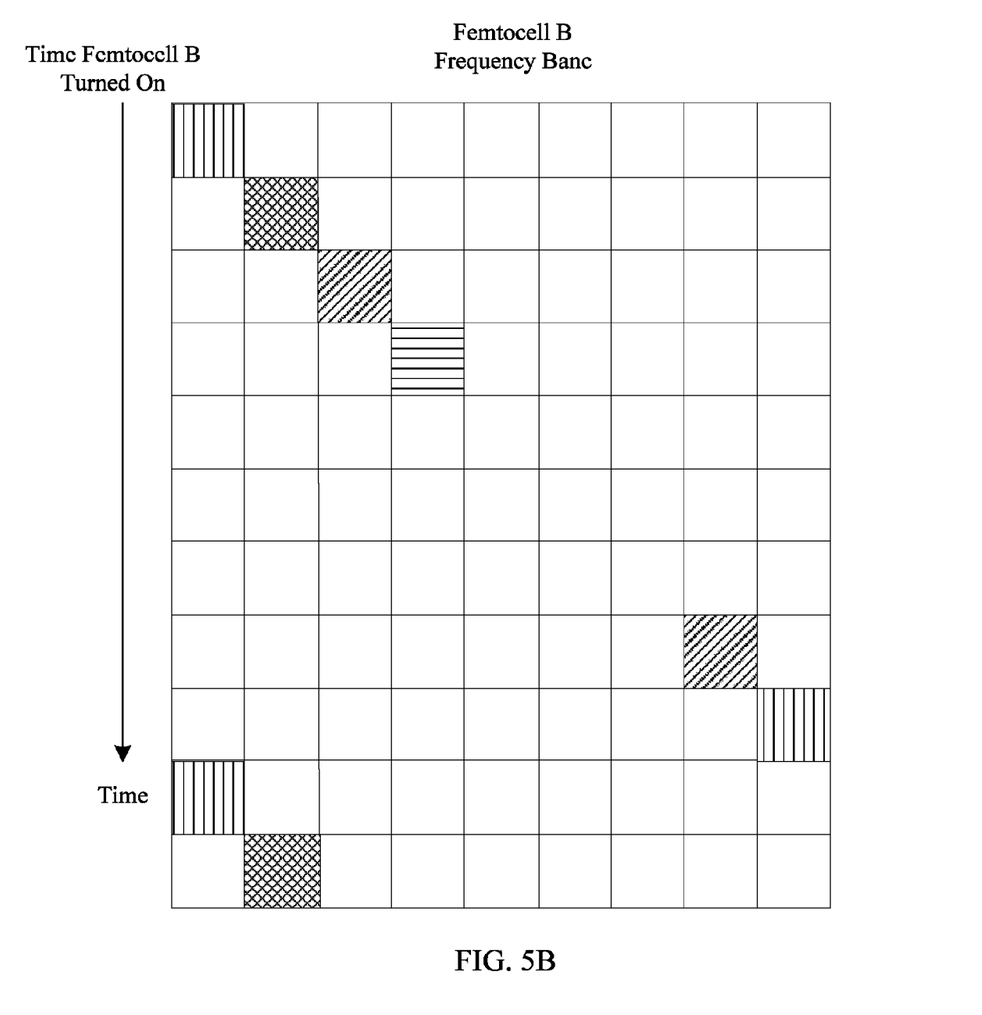

Please refer to FIG. 5A and FIG. 5B. FIG. 5A and FIG. 5B illustrate an example of slow frequency hopping for neighboring cell signal acquiring. It can be found that the frequency hopping can be based on a predefined hopping pattern which will hop at a given time reference. For example, the simplest hopping pattern will be the round robin type. The Wi-Fi will rotate its transmission every N minutes. The exact time the rotation start can be based on a timing reference common to every femtocell such as the NTP time, GPs time, etc.

When the femtocell starts to acquire the neighboring cell list, at first, the femtocell will form an ad-hoc network between all available Wi-Fi signals in all frequency bands in its surroundings. If it hops to a new frequency band, the femtocell tries to form an ad-hoc network with the other femtocells by listening to and searching for available beacons; if nothing is found, it will start sending beacons in that frequency until the dwell time is over and it hops to other frequency. Then, it will repeatedly transmit an information packet for as long as the dwell time of the hopping sequence. In practical applications, the information is a superset of the 3G UMTS BCH information payload which is carried on PCCPCH in UMTS.

If the femtocell fails to receive the information packet from the other femtocells, the femtocell will drop the Wi-Fi connection; if it receives the information packet from the other femtocells, it will pass the information together with the frequency band information and other Wi-Fi and related information to the RRM entity or similar entities in the femtocell which performs the femtocell resource management and other femtocell related function for further processing.

In addition, in order for the femtocells to function as different RNC entities (SRNC, DRNC, and CRNC), it is necessary for the femtocells to determine who is the SRNC, DRNC, and/or CRNC for a given link. The serving femtocell for a given link should be the SRNC and CRNC for the link to ensure that no femtocell should manage resource for other femtocells. The femtocell a link is soft handover to should be the DRNC for the link.

And, a three way handshaking is performed between each femtocell pairs to determine the roles between the femtocells. After the wireless link is detected and the neighboring cell list is established, each femtocell should broadcast a unique UE identification (e.g., IMEI number) of the UEs with detectable signal level and their associated power levels. Once the femtocell receives multiple copy of the above-mentioned broadcast information, the femtocell compares to its own list of UEs and the associated power levels. The femtocell having the highest received signal power of the UE should be the SRNC and CRNC. Otherwise, it will serve as the DRNC.

If more than one femtocell reports the same highest power level, the femtocell having the shortest list (i.e., the lightest loading) should be the SRNC and CRNC. Each femtocell should announce the list of UEs whom it serves as the SRNCs to other femtocells with those UEs on their broadcast list. It should be noticed that such handshaking should be performed periodically or initiated by the femtocell when there is a new UE detected and it doesn't know its role as the RNC of such new UE, and be re-initiated when a conflict is detected at the end of the handshaking.

In this embodiment, a reliable wireless link must be guaranteed before any signaling can be carried over the link. A minimum bit error or frame error rate or received signal to noise ratio must be specified. No link should be established if the signal quality is below the minimum requirement. Femtocells should use the wireless link to exchange crucial information that can help with the load balancing and help with optimizing the interference.

In fact, the information of primary scrambling code, RF capability (e.g., frequency channels supported, maximum/minimum power, and average power), current cell loading, and UE layer 1 measurement. Moreover, the femtocell should be able to estimate the SNR level for each Wi-Fi channel and automatically switch to the best channel when connecting to each other. And, the wireless link should be connected in ad-hoc mode.

Figure 6:
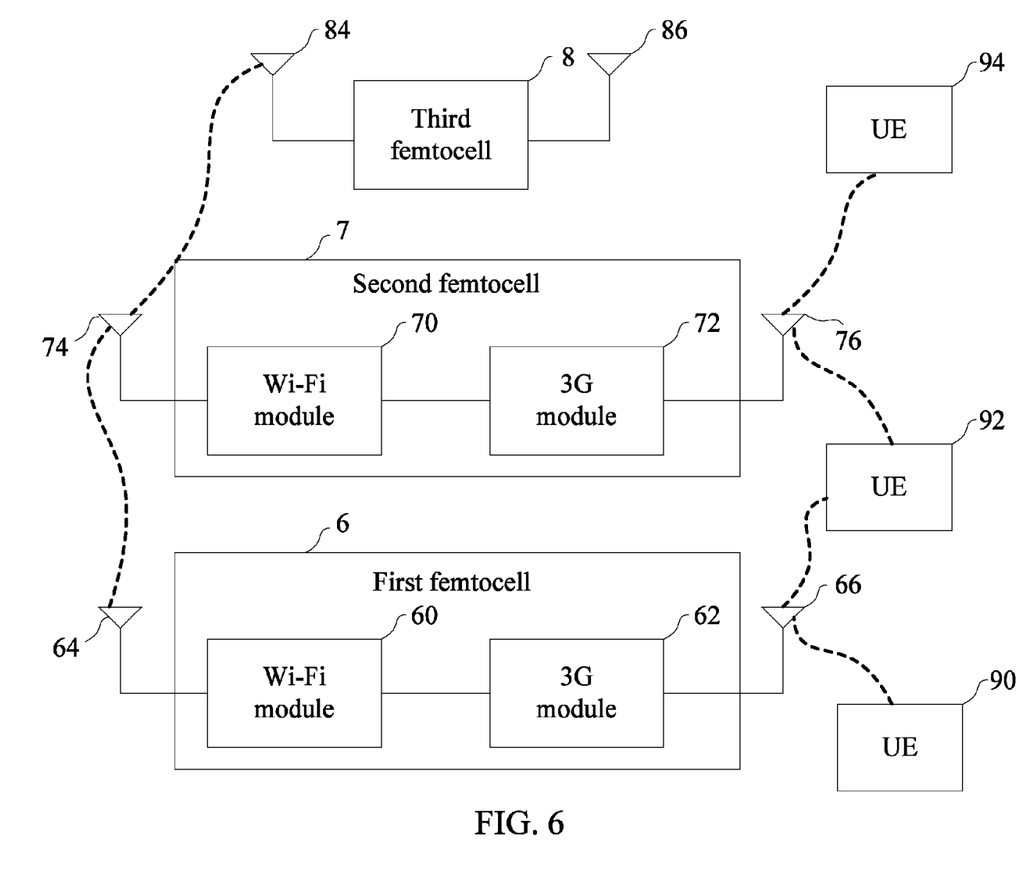
FIG. 6 illustrates an example of how the femtocells are connected through Wi-Fi.

Please refer to FIG. 6. FIG. 6 illustrates an example of how the femtocells are connected through Wi-Fi. This implementation uses Wi-Fi to form a signaling and possible data mesh network. This mesh network is not exactly the same as the conventional Wi-Fi mesh network where data are hopped from one Wi-Fi access point to the next Wi-Fi access point before it reaches a Wi-Fi having a physical connection to the internet. Each femtocell connects directly to the internet through either ADSL or Cable Modem, etc.

As shown in FIG. 6, a first femtocell 6 includes a Wi-Fi module 60, a 3G module 62, a Wi-Fi antenna 64, and a 3G antenna 66; a second femtocell 7 includes a Wi-Fi module 70, a 3G module 72, a Wi-Fi antenna 74, and a 3G antenna 76. As to the first femtocell 6, the 3G module 62 can communicate with at least one of UEs 90, 92, 94 via the 3G antenna 66, and the Wi-Fi module 60 can communicate with the second femtocell 7 or a third femtocell 8 via the Wi-Fi antenna 64 to the Wi-Fi antenna 74 or the Wi-Fi antenna 84. In the same way, as to the second femtocell 7, the 3G module 72 can communicate with at least one of UEs 90, 92, 94 via the 3G antenna 76, and the Wi-Fi module 70 can communicate with the second femtocell 6 or a third femtocell 8 via the Wi-Fi antenna 74 to the Wi-Fi antenna 64 or the Wi-Fi antenna 84.

It can be found that the use of the wireless link is to facilitate the communications between a pair of femtocells 6, 7, and 8. The information transmitted between two femtocells (e.g., the first femtocell 6 and the second femtocell 7) over the wireless link is not relayed to other femtocell (e.g., the third femtocell 8) like the conventional mesh network.

Compared to prior arts, the invention provides a femtocell wireless signaling/data mesh network having wireless communication links directly established between the femtocells using widely available point-to-point/point-to-multi-point wireless communication system, such as Wi-Fi, WiMAX, or other wireless communication technologies. Accordingly, the multi-user, multi-mode baseband signaling methods, timing/frequency synchronization, and receiver architectures can be realized. Since all challenges for establishing wireless links between the femtocells are overcome in the invention, therefore, the heavy traffic between femtocells and concentrators in prior arts can be effectively off-loaded, the handovers can become faster, and the cost of the entire network equipment can be also largely reduced.

Although the present invention has been illustrated and described with reference to the preferred embodiment thereof, it should be understood that it is in no way limited to the details of such embodiment but is capable of numerous modifications within the scope of the appended claims.

What is claimed is:

1. A femtocell wireless signaling/data mesh network, comprising:
   a plurality of femtocells connected by a plurality of wireless links, a first femtocell of the plurality of femtocells directly communicating with a second femtocell of the plurality of femtocells via a wireless link between the first femtocell and the second femtocell; and
   a signaling and data router module coupled to the second wireless module and the first wireless link module to process a signaling and data routing;
   wherein the first femtocell comprises a first wireless link module and a first wireless link antenna, the first wireless link module communicates with the second femtocell via the first wireless link antenna to form the wireless link between the first femtocell and the second femtocell, the first femtocell further comprises a second wireless module and a second wireless antenna, the second wireless module communicates with a user equipment via the second wireless antenna; the signaling and data router module is used for directing a user data and signaling protocol to either a core network or the first wireless link when user data and a signaling are for the second femtocell.

2. The femtocell wireless signaling/data mesh network of claim 1, wherein the plurality of wireless links is based on a point-to-point wireless communication system or a point-to-multi-point wireless communication system.

3. The femtocell wireless signaling/data mesh network of claim 1, wherein the plurality of wireless links is based on Wi-Fi technology, WiMAX technology, CDMA technology, GSM technology, GPRS technology, IS95 technology, or Bluetooth technology.

4. The femtocell wireless signaling/data mesh network of claim 1, wherein the plurality of femtocells is connected to a concentrator/aggregator of a cellular network, the communication between the first femtocell and the second femtocell offloads the traffic between the concentrator/aggregator and the first femtocell and the traffic between the concentrator/aggregator and the second femtocell.

5. The femtocell wireless signaling/data mesh network of claim 1, wherein a signaling and data exchange between the first femtocell and the second femtocell is realized via the wireless link between the first femtocell and the second femtocell.

6. The femtocell wireless signaling/data mesh network of claim 1, wherein the first femtocell maintains a list of neighboring femtocell information comprising the second femtocell.

7. The femtocell wireless signaling/data mesh network of claim 1, wherein the first femtocell acquires neighboring femtocell signals comprising a signal of the second femtocell based on a slow frequency hopping method.

8. The femtocell wireless signaling/data mesh network of claim 1, wherein the first femtocell functions as a Radio Network Controller (RNC) entity, the RNC entity is a Serving Radio Network Controller (SRNC) entity, a Drift Radio Network Controller (DRNC) entity, or a Controlling Radio Network Controller (CRNC) entity.

* * * * *